Nov. 2, 1937.  H. J. HERSEY, JR., ET AL  2,097,663
NONCOLLAPSING FLEXIBLE PIPE
Filed June 25, 1936
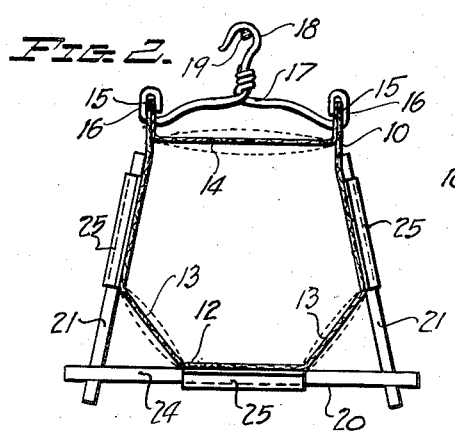
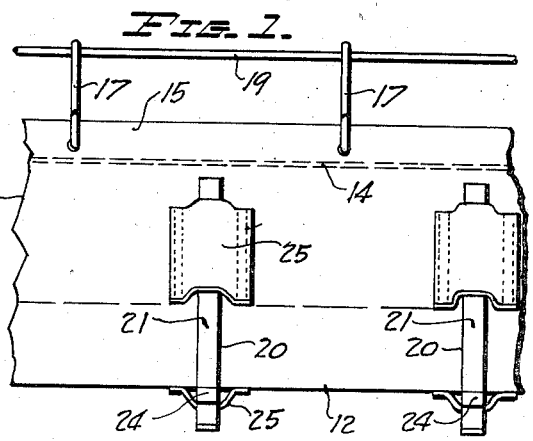
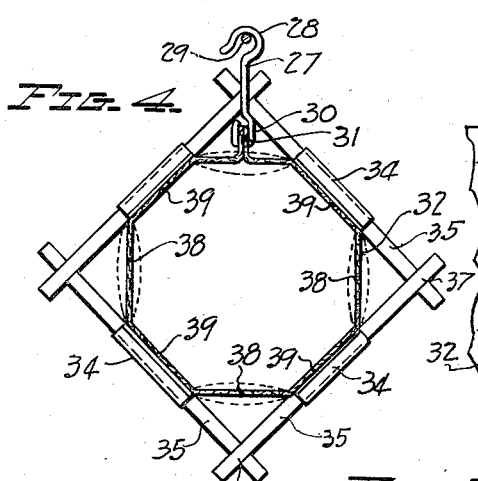
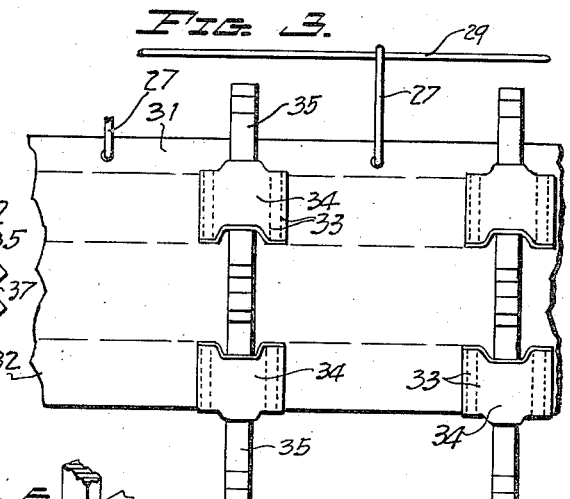
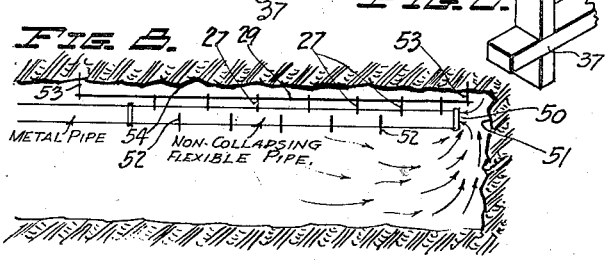
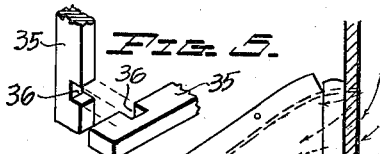
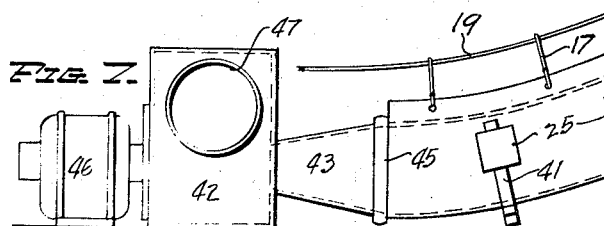
INVENTORS:
H. J. HERSEY, JR.,
D. B. MIKESELL,
BY
ATTORNEY Patented Nov. 2, 1937

2,097,663

UNITED STATES PATENT OFFICE 2,097,663

NONCOLLAPSING FLEXIBLE PIPE

Henry J. Hersey, Jr., Seattle, Wash., and Daniel B. Mikesell, Warsaw, Ind.

Application June 25, 1936, Serial No. 87,246

7 Claims. (Cl. 138—54)

This invention relates to a non-collapsing, flexible pipe or tube which is usually made of canvas or other woven material, though not necessarily limited to a specific material.

So-called flexible pipe is in common use as a conductor for air or other gas, and is especially adaptable to serve in ventilating underground passages in gold, metal or other mines, for the purpose of removing impure air and noxious gases.

The principal objects of the invention are to provide:

First.—Portable means for holding ordinary flexible pipe or tubing which is normally collapsible, substantially distended, that is to say, to prevent the collapsing thereof.

Second.—Portable means for conveniently rendering a flexible pipe or tube non-collapsing in such a manner that the means which prevent collapsing, may be quickly applied and quickly removed as the case may require.

Third.—Portable means to prevent normal collapsing of flexible pipe or tubing without rendering the same unfit to perform the normal collapsing function when the aforesaid preventive means are detached.

Fourth.—Portable rigid frames of polygonal or U form made of suitable material such as metal or wood, and extending transversely around the outside of the pipe or tube, the rigid frames being removably attached by means of loops stitched to the pipe or tubing, or in other suitable ways.

In practice, a plurality of removable multiple-piece polygonal frames extend around the girth of the pipe, and are spaced apart from one another along the length of the pipe as required.

The U-shaped form may consist of three members separable from one another, and the polygonal form may consist of three or more members, usually four, which also are separable from one another. In either the polygonal or U-shaped forms, the members intersect one another, and at the points of intersection may be notched to form mutually interlocking joints.

In cases where the flexible tubing is used on the "blowing" side of a fan, the current of air or gas is under a pressure and naturally inflates the tubing. However, when flexible tubing is used on the inlet or suction side of a fan, the tubing is naturally deflated and therefore collapses unless provision is made to apply the invention and prevent such collapse.

In the drawing:

Fig. 1 represents a fragmentary side elevation of a flexible pipe or tube equipped with the invention in one of its forms;

Fig. 2, a cross-section taken on the line 2—2 in Fig. 1;

Fig. 3, a fragmentary side elevation of a flexible pipe or tube equipped with the invention in another form;

Fig. 4, a cross-section taken on the line 4—4 in Fig. 3;

Fig. 5, a fragmentary view in perspective, drawn to an enlarged scale, and showing a typical method of notching the frame members at the intersections, to form an interlocking joint;

Fig. 6, a view similar to that in Fig. 5, but showing the completed joint;

Fig. 7, an elevation, drawn to a reduced scale, and indicating a flexible tube, rendered non-collapsible by means of the invention, the said tube being disposed to lead to the suction end of a blower, from a space in back of a bulkhead; and Fig. 8, a fragmentary, vertical, longitudinal section, indicating the disposition of a non-collapsible flexible pipe near the face of a tunnel or drift.

Referring to the drawing, the numeral 10, Figs. 1 and 2, indicates a pipe or tube made of flexible material, such as canvas. This tube may be of a design that is well known, and which has the lower main portion 12 and the upper portion 14, these two portions being seamed together to form the two oppositely disposed, upstanding flanges 15. The flanges 15 may be engaged by eyelet portions 16 formed at opposite extremities of the bails 17. These bails may have the centrally located hooks 18, by means of which the bails with the depending pipe, may be suspended from a messenger cable 19.

Spaced apart from one another, and preferably so as to alternate with the hangers 17, are frames 20, each of these frames being made of substantially rigid side members 21 and bottom member 24. The members 21 and 24 intersect one another and may be joined by notching the respective members in a mutually interlocking relation, somewhat after the manner indicated in Figs. 5 and 6. These members may be made in any suitable form and of any suitable material, such as wood or metal, but for most purposes strips or sticks of hardwood are preferable, owing to the fact that they are not rusted or corroded when contacted by water or acids. The frames 20 may be easily applied to the tube by slipping the sticks 21 and 24 through sleeves or loops 25, which latter may be sewed or otherwise fastened to the flexible tube. After placing the sticks in the respective loops, the sticks are assembled in the interlocking relation to form the complete frames 20.

In another construction, hangers of a different form, such as those at 27, may be employed. These hangers may have the hooks 28 which extend over a messenger wire 29, and eyelets 30 adapted to engage a flange 31 formed along the upper side of a tube 32. This tube may have the sleeves or loops 34 substantially in alignment with one another transversely of the tube, and fastened thereto by sewed seams 33, or by other means of fastening.

Extending through the loops 34 are sticks 35, which intersect one another and are notched at 36 so as to permit their assembly in mutually interlocking relationship as indicated at 37.

If desired, unsupported girth portions 38 of the tube, may alternate with the loop supported portions 39 in any suitable proportions. In the present example, the portions are substantially equal, thereby giving the tube, in cross-section, substantially the outline of an octagon.

An example of the manner in which the non-collapsing tubing is used, is illustrated in Fig. 7, where a tube 40 having the rigid frames 41, is shown connected to a blower 42, having the inlet 43 joined to the tubing at 45. At 46 is a motor for driving the blower, and at 47 is the usual discharge opening of the blower, which may be connected to an outlet tube (not shown) of ordinary design.

It will be noted that when the blower is set in motion, air or gas may be sucked in from a space such as 48 behind a bulkhead 49, while obviously, the rigid frames 41 prevent the collapse of the tube 40, irrespective of whether the design in Fig. 2 or Fig. 4, or any modification thereof, is used.

The portions 13 and 14 in Fig. 2, and the portions 38 in Fig. 4, for convenience, are shown in planes. When gas is sucked through the pipe, these portions are cupped slightly inward, as indicated in dotted lines, while blowing gas through the pipe, causes the same portions to be cupped slightly outward, also indicated in dotted lines.

Advantages of the invention are that, except for sleeves or loops, the pipe is the same as ordinary flexible pipe and can be used as such, without the sticks or slats, for blowing.

The sticks or slats are small in size, light in weight, may be carried in convenient bundles, and may be installed in a few minutes when it is desired to use the pipe for suction purposes. Thus the rigid frames are portable in every sense.

The spacing of the rigid portable frames along the length of the pipe, as a rule, may vary from a distance equal to the diameter of the pipe, to one and one-half times this distance or more, depending upon individual conditions.

The use, in driving a tunnel, drift or raise, of a flexible pipe equipped with our improvement, is indicated by the diagram in Fig. 8. In such use, the purpose generally is to draw the foul air or other gases, especially after blasting, away from the face. In Fig. 8, the suction intake of the pipe may be at 50, close to the face 51, so that the foul gases follow paths indicated approximately by the arrows. Supposing the flexible pipe to be the type shown in Figs. 3 and 4, the rigid frames are indicated at 52 and the hangers at 27 suspended from the messenger cable 29 which may be stretched between supports 53 imbedded in the roof 54 of the tunnel. When blasting is in progress, the flexible pipe may be closed together, accordion fashion, by pushing the intake end 50 of the pipe back from the tunnel face 51. The flexible pipe may usually be shortened in this way to occupy only about one fifth its normal length.

Obviously, the improvement does not prevent the flexible pipe from being used for blowing, as well as exhausting gases.

While we describe and show herein, excellent embodiments of our invention, still, numerous variations may be introduced without departing from the spirit and scope of the following claims.

Having fully described our invention, what we claim is:

1. A collapsible flexible pipe and means for rendering the same non-collapsing, including in combination, a pipe made of flexible material, a plurality of rigid frames spaced apart from one another along the length of the pipe, each frame consisting of a plurality of rigid members encircling the girth of the flexible pipe, and a group of girth loops for each frame suitably attached to the pipe, each of the said loops being relatively short and adapted to slip over the respective rigid members of the corresponding frame independently of one another while the pipe is inflated, for the purpose of preventing the collapsing of the flexible pipe when deflated.

2. Means for quickly rendering a collapsible flexible pipe non-collapsible and quickly returning the pipe to its original state when desired, including in combination, a pipe made of flexible material, girth loops spaced apart from, but disposed in substantial alignment with one another around the circumference of the pipe, substantially rigid strips extending through the said loops so as to interlock with one another in the spaces between the loops and form substantially rigid quickly removable polygonal frames effective to hold the flexible pipe distended.

3. Means for quickly rendering a collapsible flexible pipe non-collapsible and quickly returning the pipe to its original state when desired, including in combination, a flexible pipe, substantially rigid girth frames spaced apart from one another longitudinally along the said pipe, each girth frame consisting of a plurality of interlocking members detachable from one another, and means for detachably connecting the flexible pipe to the component members of each of the girth frames for the purpose of holding the flexible pipe distended.

4. Means for quickly rendering a collapsible flexible pipe non-collapsible and quickly returning the pipe to its original state when desired, comprising a pipe made of flexible material, a plurality of loops spaced apart from one another around the girth of the pipe, and a substantially rigid girth frame comprising a plurality of rigid strips extending through the respective girth loops and interlocking with one another to form a substantially rigid frame effective to hold the flexible tube distended.

5. Means for quickly rendering a collapsible flexible pipe non-collapsible and quickly returning the pipe to its original state when desired, including in combination, a pipe made of flexible material, a substantially rigid frame extending around the girth of the flexible tube, the said frame consisting of a plurality of independently detachable, interlocked members assembled in polygonal form, and means for detachably connecting the flexible pipe to each of the frame members.

6. Means for quickly rendering a collapsible flexible pipe non-collapsible and quickly returning the pipe to its original state when desired, including in combination, a flexible pipe, a plurality of relatively short loops spaced apart from one another around the girth of the flexible pipe and a corresponding plurality of rigid frame members removably disposed in the said loops in such a manner that the frame members have sufficient play for the frame members to be interlocked with one another at their points of intersection; the said points of intersection being located in the spaces between the said loops.

7. A flexible tube, a frame extending around the girth of the tube, said frame consisting of a plurality of mutually intersecting substantially rectilinear rigid members, loops attached to the flexible tube and so positioned that the frame members in assembling, may be slipped independently from one another through the proper loops until the frame members intersect one another, and means for interlocking mutually adjacent frame members at their point of intersection.

HENRY J. HERSEY, Jr.
DANIEL B. MIKESELL.